(12) United States Patent
Teasley

(10) Patent No.: US 8,609,804 B2
(45) Date of Patent: Dec. 17, 2013

(54) POLYARYLENE POLYMERS AND PROCESSES FOR PREPARING

(75) Inventor: Mark F Teasley, Landenberg, PA (US)

(73) Assignee: E I du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 13/590,636

(22) Filed: Aug. 21, 2012

(65) Prior Publication Data

US 2012/0322973 A1    Dec. 20, 2012

Related U.S. Application Data

(62) Division of application No. 12/979,417, filed on Dec. 28, 2010.

(60) Provisional application No. 61/290,572, filed on Dec. 29, 2009.

(51) Int. Cl.
*C08G 75/00* (2006.01)

(52) U.S. Cl.
USPC .............. 528/391; 528/125; 528/171; 568/34

(58) Field of Classification Search
USPC .................. 528/171, 125, 391, 373; 568/34
See application file for complete search history.

(56) References Cited

U.S. PATENT DOCUMENTS

| | | | |
|---|---|---|---|
| 5,565,543 A | 10/1996 | Marrocco, III et al. | |
| 5,889,134 A | 3/1999 | Pu et al. | |
| 5,962,631 A | 10/1999 | Woo et al. | |
| 6,353,072 B1 | 3/2002 | Towns et al. | |
| 2005/0239994 A1 * | 10/2005 | Litt et al. ................. | 528/171 |
| 2006/0166048 A1 | 7/2006 | Sakaguchi et al. | |
| 2008/0287646 A1 | 11/2008 | Hida et al. | |
| 2009/0036632 A1 * | 2/2009 | Hida et al. ................. | 528/127 |
| 2010/0105786 A1 | 4/2010 | Onodera et al. | |

FOREIGN PATENT DOCUMENTS

| | | |
|---|---|---|
| JP | 2005248143 A | 9/2005 |
| WO | 0053656 A1 | 9/2000 |

OTHER PUBLICATIONS

N. Miyaura et al., The Palladium-Catalyzed Cross-Coupling Reaction of Phenylboronic Acid With Halorenes in the Present of Bases, Synthetic Communications, vol. 11, No. 7 (1981), pp. 513-519.
M. Iyoda et al., Homocoupling of Aryl Halides Using Nickel(II) Complex and Zinc in the Present of ET4NI. An Efficient Method for the Synthesis of Biaryls and Bipyridines, Bull. Chem. Soc. JP, vol. 63, No. 1 (1990), pp. 80-87.
C. Courtot et al., Contribution a L'Etude de la Serie du Diphenyle, Bull. Societe Chim FR, vol. 49 (1931), pp. 1047-1065 (Article Submitted in French; Translation is not Readily Available).
I. Colon et al., High Molecular Weight Aromatic Polymers by Nickel Coupling of Aryl Polychlorides, Journal of Polymer Science: Part A: Polymer Chemistry, vol. 28 (1990), pp. 367-383.
M. Moroni et al., Rigid Rod Conjugated Polymers for Nonlinear Optics. 1. Characterization and Linear Optical Properties of Poly(Aryleneethynylene) Derivatives, Macromolecules, vol. 27 (1994), pp. 562-571.
T. I. Wallow et al., Palladium-Mediated Poly(P-Phenylene) Synthesis: Evidence for a Molecular Weight Limiting Phosphine Arylation Reaction, American Chemical Society, Polymer Preprint, vol. 34, No. 1 (1993), pp. 1009-1010.
Y. Wang et al., Synthesis and Characterization of Poly(Benzoyl-1,4-Phenylene)S. 2. Catalyst Coligand Effects on Polymer Properties, Macromolecules, vol. 28, No. 10 (1995), pp. 3495-3501.
T. Yamamoto, Electrically Conducting and Thermally Stable *-Conjugated Poly(Arylene)S Prepared by Organometallic Processes, Prog. Polym. Sci., vol. 17 (1992), pp. 1153-1205.
A. I. Vogel, Vogel's Textbook of Practical Organic Chemistry, 4th Edition (1978), Longman Press, London, pp. 285-286.
T. Yamamoto, Electrically Conducting and Thermally Stable'-Conjugated Poly(Arylene)S Prepared by Organometallic Processes, Prog. Polym. Sci., vol. 17 (1992), pp. 1153-1205.
International Search Report, PCT International Application No. PCT/US2010/062199, Mailed Sep. 28, 2011.

* cited by examiner

*Primary Examiner* — Shane Fang

(57) ABSTRACT

Provided are sulfone-containing polyarylene polymers, and processes for preparing the polymers. The polyarylene polymers are suitable for use as engineering polymers.

7 Claims, No Drawings

POLYARYLENE POLYMERS AND PROCESSES FOR PREPARING

FIELD OF THE INVENTION

The present invention is directed to polyarylene polymers useful as engineering polymers, and to processes and monomers for use in preparing the polymers.

BACKGROUND

High performance polymers (HPP) are a fast growing portion of the engineering polymers market. These polymers offer excellent performance under harsh operating conditions by virtue of their high temperature stability, chemical resistance, high tensile properties, and abrasion resistance. However, existing polymers all display compromises in certain attributes while excelling in others. In general, thermoplastic HPP are either semi-crystalline or amorphous with the former typically offering superior chemical and abrasion resistance and the latter superior thermal resistance and mechanical toughness. The most common semi-crystalline HPP are polyphenylene sulfide, liquid-crystal polyesters, and polyether ketones, and the most common amorphous HPP are polyether sulfones and thermoplastic polyimides. These polymers are typically filled with glass fiber, carbon fiber, graphite, and other materials as reinforcements to improve their tensile properties, dimensional stability, and wear resistance.

One particularly new type of HPP is self-reinforced polyphenylene (SRP), an amorphous polymer with many of the attributes of the semi-crystalline polymers. SRP offers a unique combination of tensile properties, abrasion resistance, chemical resistance, and thermal stability. The key to its high performance is the rigid-rod phenylene backbone which makes further fiber reinforcement unnecessary. The polyphenylene backbone can be substituted with phenylketone groups to render it amorphous and allow for thermal processing. For example, Wang and Quirk, Macromolecules, 1995, 28 (10), p. 3495, disclose that poly(2,5-benzophenone) is thought to be amorphous due to the head-tail disorder introduced in the polymer backbone during polymerization of 2,5-dichlorobenzophenone and that the degree of disorder has an effect on the glass transition temperature (Tg) of the polymer.

Since the ketone version of SRP is already amorphous, but retains many attributes of a semi-crystalline HPP, a sulfone version of SRP, such as poly(2,5-diphenylsulfone) (PDS), has the potential to expand its set of properties without compromising those normally due to semi-crystallinity and expand its utility into applications currently meet only by high performance polyimide products. However, the polymerization conditions that are successful for poly(2,5-benzophenone) do not produce high molecular weight PDS.

SUMMARY OF THE INVENTION

One aspect of the present invention is a polymer comprising repeating units of Formula (I):

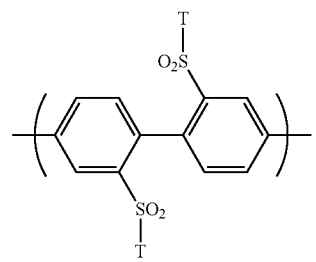

wherein T is a bulky aromatic group.

DETAILED DESCRIPTION

Disclosed is a polymer comprising repeating units of Formula (I):

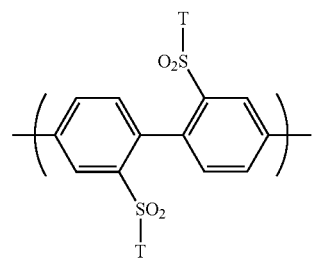

wherein T is a bulky aromatic group. The repeat unit can be referred to as a rigid-rod polyarylene; however it has a higher degree of structural order than typical rigid-rod polyphenylenes by virtue of its symmetrically meta-disubstituted biphenylene structure.

By bulky aromatic group is meant an aromatic carbocyclic group having a single ring (e.g., phenyl), multiple rings (e.g., biphenyl), or multiple condensed rings in which at least one is aromatic, (e.g., 1,2,3,4-tetrahydronaphthyl, naphthyl, anthryl, or phenanthryl). The bulky aromatic group can be optionally substituted with a non-reactive group, such as alkyl, other aromatic groups, and other non-reactive functional groups such as ethers. In one embodiment, T is phenyl.

The term "polymer" is intended to include homopolymers, copolymers, and terpolymers.

The polymer can have a number average molecular weight ($M_n$) of at least about 5,000, or at least about 15,000, or at least about 19,000. The polymer can also have a weight average molecular weight ($M_w$) of at least 80,000, or at least 200,000.

In one embodiment, the polymer is a homopolymer. In another embodiment, the polymer is a copolymer, containing other repeat units. Such other repeat units can maintain the rigid-rod nature of the biphenylene backbone of the polymer comprising repeating units of Formula (I), or can introduce varying degrees of flexibility. Appropriate rigid-rod repeat units can be similar in chemical composition and structure to preserve the physical properties of the polymer comprising repeating units of Formula (I) or can be different to introduce additional properties required for processing and/or for the desired application of the polymer. In one embodiment, the polymer can additionally comprise repeating units of Formula (II):

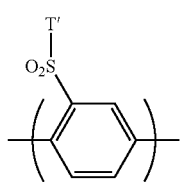

(II)

where T' is a bulky aromatic group. In one embodiment, T' is phenyl. These embodiments introduce sufficient head-tail disorder in the phenylene repeat units of the polymer to modify its physical properties while preserving the rigid-rod structure. Polymers comprising repeating units of both Formula (I) and Formula (II) can have a number average molecular weight ($M_n$) of at least about 5,000, or at least about 9,000, or at least about 60,000. The polymers can also have a weight average molecular weight ($M_w$) of at least 40,000, or at least 300,000.

A suitable monomer to prepare polymers comprising repeating units of Formula (I) is a compound of Formula (IA):

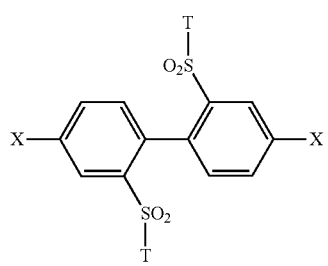

(IA)

wherein T is as described above and X is independently Br or Cl, typically Cl, and has a higher degree of structural order than typical rigid-rod polyphenylenes by virtue of its symmetrically meta-disubstituted biphenylene structure.

A suitable monomer to prepare polymers comprising repeating units of Formula (II) is a compound of Formula (IIA):

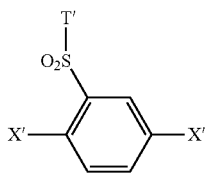

(IIA)

wherein T' is as described above and X' is independently Br or Cl, typically Cl. Although the sulfone group is ortho-substituted with respect to one of the halide groups, high molecular weight is attainable during copolymerization with meta-substituted monomer of Formula (IA).

The polymer comprising repeating units of Formula (I) with repeating units of Formula (II) can be block, random, or alternating copolymers.

The monomers of Formulae (IA) and (IIA) may be reacted to form larger monomeric units that are then polymerized alone or with other monomers to form the polymers disclosed herein. For example, a copolymer $(-A-)_x(-B-)_y$ may be formed by copolymerizing monomer X-A-X with monomer X—B—X, or by forming larger monomer X-A-B—X and polymerizing that monomer. In both cases, the resulting polymer is considered a copolymer derived from monomer X-A-X and monomer X—B—X.

The monomers of Formula (IA) and (IIA), and the reactants used to prepare the monomers, may be obtained commercially or be prepared using any known method in the art or those disclosed herein.

The practical upper limit to the number of monomeric units in the polymer is determined in part by the desired solubility of a polymer in a particular solvent or class of solvents. As the total number of monomeric units increases, the molecular weight of the polymer increases. The increase in molecular weight is generally expected to result in a reduced solubility of the polymer in a particular solvent. Moreover, in one embodiment, the number of monomeric units at which a polymer becomes substantially insoluble in a given solvent is dependent in part upon the structure of the monomer. For example, a polymer composed of disubstituted biphenylene-based monomers may become substantially insoluble in an organic solvent if the resulting polymer becomes too rigid in the course of polymerization and the biphenylene repeat unit is too structurally regular due to the structure of T. In another embodiment, the number of monomeric units at which a copolymer becomes substantially insoluble in a given solvent is dependent in part upon the ratio of the comonomers. As another example, a copolymer composed of several rigid monomers may become substantially insoluble in an organic solvent when ratio of disubstituted biphenylene monomeric units to substituted phenylene monomeric units is too large. The selection of polymer molecular weight, polymer and copolymer composition, and a solvent is within the purview of one skilled in the art.

The polymerizations as described herein can generally be performed by synthetic routes in which the leaving groups of the monomers are eliminated in carbon-carbon bond-forming reactions. Such carbon-carbon bond-forming reactions are typically mediated by a zerovalent transition metal complex that contains neutral ligands. In one embodiment, the zerovalent transition metal complex contains nickel or palladium. By "complex", as used herein, is meant one or more metal cations together with associated anions and/or neutral ligands.

Neutral ligands are defined as ligands that are neutral, with respect to charge, when formally removed from the metal in their closed shell electronic state. Neutral ligands contain at least one lone pair of electrons, a pi-bond, or a sigma bond that is capable of binding to the transition metal. For the processes described herein, the neutral ligand may also be a combination of two or more neutral ligands. Neutral ligands may also be polydentate when more than one neutral ligand is connected via a bond or a hydrocarbyl, substituted hydrocarbyl or a functional group tether. A neutral ligand may be a substituent of another metal complex, either the same or different, such that multiple complexes are bound together. Neutral ligands can include carbonyls, thiocarbonyls, carbenes, carbynes, allyls, alkenes, olefins, cyanides, nitriles, carbon monoxide, phosphorus containing compounds such as phosphides, phosphines, or phosphites, acetonitrile, tetrahydrofuran, tertiary amines (including heterocyclic amines), ethers, esters, phosphates, phosphine oxides, and amine oxides.

Three synthetic methods based on zerovalent transition metal compounds that can be used to prepare the polymers are described herein. In each method, the zerovalent transition metal compound that is the active species in carbon-carbon bond formation can be introduced directly into the reaction, or can be generated in situ under the reaction conditions from a precursor transition metal compound and one or more neutral ligands.

In a first synthetic method, disclosed in Yamamoto, Progress in Polymer Science, Vol. 17, p 1153 (1992), the dihalo derivatives of the monomers are reacted with stoichiometric amounts of a zerovalent nickel compound, such as a coordination compound like bis(1,5-cyclooctadiene)nickel (0), and a neutral ligand, such as triphenylphosphine or 2,2'-bipyridine. These components react to generate the zerovalent nickel compound that is the active species in the polymerization reaction. A second neutral ligand, such as 1,5-cyclooctadiene, can be used to stabilize the active zerovalent nickel compound.

In a second synthetic method, disclosed in U.S. Pat. No. 5,962,631, Ioyda et al., Bulletin of the Chemical Society of Japan, Vol. 63, p. 80 (1990), and Colon et al., Journal of Polymer Science, Part A, Polymer Chemistry Edition, Vol. 28, p. 367 (1990), the dihalo derivatives of the monomers are reacted with catalytic amounts of a divalent nickel compound in the presence of one or more neutral ligands in the presence of stoichiometric amounts of a material capable of reducing the divalent nickel ion to zerovalent nickel.

The catalyst is formed from a divalent nickel salt. The nickel salt can be any nickel salt that can be converted to the zerovalent state under reaction conditions. Suitable nickel salts are the nickel halides, typically nickel dichloride or nickel dibromide, or coordination compounds, typically bis(triphenylphosphine)nickel dichloride or (2,2'-bipyridine) nickel dichloride. The divalent nickel salt is typically present in an amount of about 0.01 mole percent or greater, more typically about 0.1 mole percent or greater or 1.0 mole percent or greater. The amount of divalent nickel salt present is typically about 30 mole percent or less, more typically about 15 mole percent or less based on the amount of monomers present.

The polymerization is performed in the presence of a material capable of reducing the divalent nickel ion to the zerovalent state. Suitable material includes any metal that is more easily oxidized than nickel. Suitable metals include zinc, magnesium, calcium and lithium, with zinc in the powder form being typical. At least stoichiometric amounts of reducing agent based on the monomers are required to maintain the nickel species in the zerovalent state throughout the reaction. Typically, about 150 mole percent or greater, more typically about 200 mole percent or greater, or about 250 mole percent or greater is used. The reducing agent is typically present in an amount of about 500 mole percent or less, about 400 mole percent or less, or about 300 mole percent or less based on the amount of monomer.

Also present are one or more compounds capable of acting as a ligand. Suitable ligands are neutral ligands as described above, and include trihydrocarbylphosphines. Typical ligands are monodentate, such as triaryl or trialkylphosphines like triphenylphosphine, or bidentate, such as 2,2'-bipyridine. A compound capable of acting as a monodentate ligand is typically present in an amount of from about 10 mole percent or greater, or about 20 mole percent or greater based on the monomer. A compound capable of acting as a monodentate ligand is typically present in an amount of about 100 mole percent or less, about 50 mole percent or less, or about 40 mole percent or less. A compound capable of acting as a bidentate ligand is typically present in an amount that is about a molar equivalent or greater based on the divalent nickel salt.

Alternatively, the bidentate ligand can be incorporated into the nickel salt as a coordination compound as described above.

In a third synthetic method, disclosed in PCT application WO 00/53656 and U.S. Pat. No. 6,353,072, a dihalo derivative of one monomer is reacted with a derivative of another monomer having two leaving groups selected from boronic acid (—$B(OH)_2$) or boronate salt, boronic acid esters (—$BOR_2$) or (—B(ORO)), and boranes (—$BR_2$), where R is generally a hydrocarbyl group, in the presence of a catalytic amount of a zerovalent palladium compound containing a neutral ligand as described above, such as tetrakis(triphenylphosphine)palladium(0). If the leaving group is a boronic ester or borane group, the reaction mixture should include sufficient water or an organic base to hydrolyze the boronic ester or borane group to the corresponding boronic acid group. The diboronic derivative of a monomer can be prepared from the dihalo derivative by known methods, such as those described in Miyaura et al., Synthetic Communication, Vol. 11, p. 513 (1981) and Wallow et al., American Chemical Society, Polymer Preprint, Vol. 34, (1), p. 1009 (1993).

All of the synthetic methods disclosed herein can be performed in the presence of a compound capable of accelerating the reaction. Suitable accelerators include alkali metal halides such as sodium bromide, potassium bromide, sodium iodide, tetraethylammonium iodide, and potassium iodide. The accelerator is used in a sufficient amount to accelerate the reaction, typically 10 mole percent to 100 mole percent based on the monomer.

The reactions are typically run in a suitable solvent or mixture of solvents, that is a solvent that is not detrimental to catalyst, reactant and product, and preferably one in which the reactants and products are soluble. Suitable solvents include N,N-dimethylformamide (DMF), toluene, tetrahydrofuran (THF), acetone, anisole, acetonitrile, N,N-dimethylacetamide (DMAc), and N-methylpyrrolidinone (NMP). The amount of solvent used in this process can vary over a wide range. Generally, it is desired to use as little solvent as possible. The reactions are typically conducted in the absence of oxygen and moisture, as the presence of oxygen can be detrimental to the catalyst and the presence of a significant amount of water could lead to premature termination of the process. More typically, the reaction is performed under an inert atmosphere such as nitrogen or argon.

The reactions can be performed at any temperature at which the reaction proceeds at a reasonable rate and does not lead to degradation of the product or catalyst. Generally, the reaction is performed at a temperature of about 20° C. to about 200° C., more typically less than 100° C. The reaction time is dependent upon the reaction temperature, the amount of catalyst and the concentration of the reactants, and is usually about 1 hour to about 100 hours.

The polymers prepared by the disclosed methods can be recovered according to conventional techniques including filtration and precipitation using a non-solvent. They also can be dissolved or dispersed in a suitable solvent for further processing.

The polymers disclosed herein are suitable for use as engineering polymers in applications such as, for example, molecular reinforcement in nanocomposites, mineral-filled and fiber-reinforced composites, injection and compression-molded parts, fibers, films, sheets, papers, and coatings, and can be processed both thermally as is typical for thermoplastic polymers and in solution after dissolving in suitable solvents depending on the requirements of the application.

EXAMPLES

Activation of Copper Powder

Copper powder was activated according to the procedure in Vogel's Textbook of Practical Organic Chemistry, 4th Edition, 1981, Longman (London), pages 285-286. Copper bronze (50 g, Aldrich Chemical Company, Milwaukee, Wis.) was stirred for 10-20 minutes with a solution of iodine (10 g) dissolved in acetone (500 mL) to give a gray mixture. The copper was filtered off, washed acetone, and added to a solution of hydrochloric acid (150 mL) and acetone (150 mL). The mixture was stirred until the gray solids dissolved then the copper was filtered off and washed well with acetone. The activated copper solids were dried under high vacuum and transferred to a glove box for storage and handling.

2,5-Dibromobenzenesulfonic acid, sodium salt

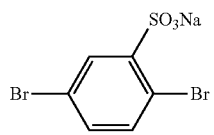

A modification of the published procedures of H. Borns, Annalen der Chemie 1877, 187, 350 was used. A 300 mL round-bottom flask equipped with a reflux condenser, stirring bar, and gas inlet was charged with 1,4-dibromobenzene (118 g, 0.50 moles) and 30% fuming sulfuric acid (76 mL). The mixture was heated to 150° C. for 3 hours under nitrogen to give a clear solution. The solution was cooled to room temperature to give a solidified mass and transferred into a beaker with water to give a slurry. The slurry was treated with 50% sodium hydroxide solution (130 g) and diluted to 900 mL with water with heating to disperse the precipitated solids. The mixture was cooled to room temperature and the solids collected by vacuum filtration under a rubber dam. The solids were washed with two times with isopropanol (200 mL) and air dried on the filter then dried under vacuum at 100° C. to give 159 g (93% crude yield). The product was recrystallized from ethanol/water (4:1) and dried under vacuum at 150° C. to give 146 g (86% yield) of 2,5-dibromobenzenesulfonic acid, sodium salt. $^1$H NMR (DMSO-$d_6$): 7.42 (dd, 8.4, 2.6 Hz, 1H), 7.53 (d, 8.4 Hz, 1H), 8.01 (d, 2.6 Hz, 1H).

4,4'-Dibromobiphenyl-2,2'-disulfonic acid, sodium salt

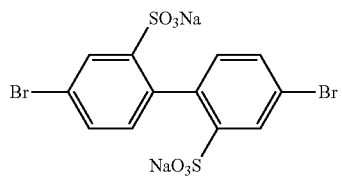

A modification of the published procedures of Courtot and Lin in Bull. Soc. Chim. Fr. 1931, 49, 1047 was used. Inside a glove box, a 500 mL round-bottom flask equipped with a reflux condenser, stirring bar, and gas inlet was charged with 2,5-dibromobenzenesulfonic acid, sodium salt (73 g, 0.216 moles), activated copper bronze (27 g, 0.43 moles), and DMAc (200 mL). The mixture was heated to 120° C. overnight under nitrogen. The mixture was poured into water (1 L) and the solid removed by vacuum filtration. The filtrate was evaporated and the residue dried at 100° C. under vacuum. The solids were recrystallized from acetonitrile/water (10:1) after treating with decolorizing carbon and dried under vacuum at 60-150° C. to give 48.13 g (86% yield) of 4,4'-dibromobiphenyl-2,2'-disulfonic acid, sodium salt. $^1$H NMR (DMSO-$d_6$): 7.19 (d, 8.3 Hz, 2H), 7.42 (dd, 8.3 and 2.1 Hz, 2H), 7.96 (d, 2.1 Hz, 2H).

4,4'-Dibromobiphenyl-2,2'-disulfonyl dichloride

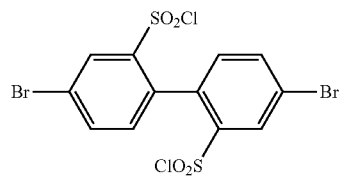

A modification of the published procedures of Courtot and Lin in Bull. Soc. Chim. Fr. 1931, 49, 1047 was used. Inside a glove box, a 200 mL round-bottom flask equipped with a reflux condenser, stirring bar, and gas inlet was charged with 4,4'-dibromobiphenyl-2,2'-disulfonic acid, sodium salt (51.6 g, 0.100 moles), phosphorus pentachloride (46 g, 0.22 moles), and phosphorus oxychloride (30 mL). The mixture was heated to a mild reflux (152° C.) for 6 hours under nitrogen. The mixture was poured onto ice (1 kg) and stirred until the solids were finely divided. The solids were collected by vacuum filtration, washed well with water, and air dried on the filter then dried under vacuum at 75° C. to give 50.7 g. The solids were recrystallized from toluene after treating with decolorizing carbon, collected by vacuum filtration, and dried under vacuum at 60° C. to give 42.59 g (84% yield) of 4,4'-dibromobiphenyl-2,2'-disulfonyl dichloride. $^1$H NMR (CDCl$_3$): 7.38 (d, 8.2 Hz, 2H), 7.91 (dd, 8.2, 2.0 Hz, 2H), 8.37 (d, 2.0 Hz, 2H).

2,5-Dibromobenzenesulfonyl chloride

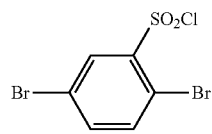

A modification of the published procedures of Moroni et al. in Macromolecules 1994, 27, 562 was used. A 300 mL round-bottom flask equipped with a reflux condenser, stirring bar, and gas inlet was charged with 1,4-dibromobenzene (50 g, 0.21 moles) and chlorosulfonic acid (100 mL). The mixture was heated to 90° C. for 2 hours under nitrogen to give a clear solution. The solution was cooled to room temperature and carefully poured onto ice (1 kg) to give a precipitate. The solids were collected by vacuum filtration, washed well with water, and air dried on the filter then dried under vacuum at 50° C. to give 68.36 g. The product was recrystallized from cyclohexane after treating with decolorizing carbon, collected by vacuum filtration, and dried at 50° C. under vacuum to give 55.37 g (79% yield) of 2,5-dibromobenzenesulfonyl chloride. $^1$H NMR (CDCl$_3$): 7.66 (dd, 8.4, 2.3 Hz, 1H), 7.72 (d, 8.4 Hz, 1H), 8.30 (d, 2.3 Hz, 1H).

Example 1

2-Benzenesulfonyl-1,4-dibromobenzene

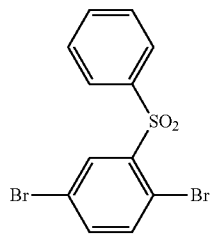 [SMILES: O=S(=O)(c1ccccc1)c1cc(Br)ccc1Br]

A 100 mL round-bottom flask equipped with a reflux condenser, stirring bar, and gas inlet was charged with 2,5-dibromobenzenesulfonyl chloride (10 g, 30 mmoles) and benzene (30 mL). Aluminum chloride (4 g, 30 mmoles) was added and the mixture stirred until dissolved. The solution was heated to reflux for 2 hours. The solution was cooled to room temperature and poured onto 150 g ice mixed with 50 mL hydrochloric acid. The precipitated solids were collected by filtration and washed with ether. The filtrate was extracted with ether and the organic extracts were washed twice with water, dried with magnesium sulfate, filtered, and evaporated. The precipitated and extracted products were combined to give 11.33 g of impure product. The solids were recrystallized from ethanol after treating with decolorizing carbon to give 3.82 g (34% yield) of 2-benzenesulfonyl-1,4-dibromobenzene. $^1$H NMR (DMSO-d$_6$): 7.65 (dd, 7.7, 7.4 Hz, 2H), 7.76 (t, 7.4 Hz, 1H), 7.76 (d, 8.4 Hz, 1H), 7.85 (dd, 8.4, 2.4 Hz, 1H), 7.98 (d, 7.7 Hz, 2H), 8.40 (d, 2.4 Hz, 1H).

This reaction was repeated on a larger scale (100 mmol) with 6 hours at reflux and worked up by extracting the hydrolyzed mixture with dichloromethane then drying with sodium carbonate. The impure product was recrystallized from ethanol to give 13.7 g (36% yield). $^{13}$C NMR (CDCl3): 120.23 (C), 122.31 (C), 129.21 (2CH), 129.39 (2CH), 134.20 (CH), 134.46 (CH), 137.38 (CH), 137.92 (CH), 139.69 (C), 142.04 (C). MS (M+H$^+$): m/e 376.8654 (100%), 374.8680 (50%), 378.8630 (49%); exact mass for $C_{12}H_9O_2Br_2S_1$, 376.8670 (100%), 374.8690 (51.4%), 378.8649 (48.6%).

Example 2

2,2'-Bis-benzenesulfonyl-4,4'-dibromobiphenyl

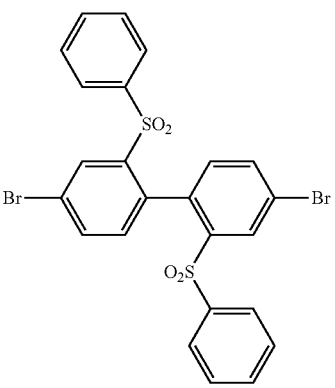 [SMILES: O=S(=O)(c1ccccc1)c1cc(Br)ccc1-c1ccc(Br)cc1S(=O)(=O)c1ccccc1]

Inside a glove box, a 100 mL round-bottom flask equipped with a stirring bar, reflux condenser, and a septum was charged with 2-benzenesulfonyl-1,4-dibromobenzene (7.52 g, 20 mmoles), activated copper powder (2.54 g), and DMAc (20 mL). The flask was heated to 120° C. under nitrogen for 2 hours. The mixture was cooled to room temperature, poured into acetone, and filtered using a 5 μm PTFE membrane filter. The solvents were evaporated and the residue dried under high vacuum to give 6.40 g solids. The mixture was purified by column chromatography using silica gel and dichloromethane to give 1.74 g (29% yield) of 2,2'-bis-benzenesulfonyl-4,4'-dibromobiphenyl. $^1$H NMR (DMSO-d$_6$): 6.89 (d, 8.2 Hz, 2H), 7.54 (m, 4H), 7.55 (m, 4H), 7.69 (m, 2H), 7.86 (dd, 8.2, 2.1 Hz, 2H), 8.22 (d, 2.1 Hz, 2H).

The reaction was repeated several times at 100-120° C. varying the time from 3-7 hours without a substantial change in the yield after column chromatography. The combined products (9.46 g) were recrystallized twice from toluene to give 5.44 g pure compound. $^{13}$C NMR (DMSO-d$_6$): 122.30 (2C—Br), 127.68 (4CH), 129.40 (4CH), 131.36 (2CH), 133.68 (2CH), 133.93 (2CH), 135.06 (2C), 135.38 (2CH), 140.25 (2C—SO$_2$—), 140.92 (2C—SO$_2$—). MS (M+H$^+$): m/e 592.8907 (100%), 590.8933 (49%), 594.8884 (56%); exact mass for $C_{24}H_{17}O_4Br_2S_2$, 592.8909 (100%), 590.8930 (51.4%), 594.8889 (48.6).

Example 3

2,2'-Bis-benzenesulfonyl-4,4'-dibromobiphenyl—Alternate Procedure

Inside a glove box, a 125 mL round-bottom flask equipped with a stirring bar, reflux condenser, and gas inlet was charged with 4,4'-dibromobiphenyl-2,2'-disulfonyl dichloride (10.18 g, 20 mmoles) and aluminum chloride (5.87 g, 44 mmoles). Benzene (14 mL) and anhydrous nitromethane (40 mL) were added and the mixture stirred until dissolved. The solution was heated to 100° C. for about 8 hours. The solution was cooled to room temperature and poured onto 200 g ice mixed with 100 mL hydrochloric acid. The mixture was extracted several times with dichloromethane. The organic extracts were washed twice with water, dried with sodium carbonate, filtered, and evaporated to give 11.75 g (99%). The mixture was purified by column chromatography using silica gel and dichloromethane (R$_f$ 0.32) to give 8.73 g (74% yield) of 2,2'-bis-benzenesulfonyl-4,4'-dibromobiphenyl.

The reaction was repeated on a larger scale to give 24.37 g (87% yield) and purified by chromatography to give 17.2 g (61% yield). The combined products were recrystallized from toluene after treating with decolorizing carbon to give 23.02 g (89% mass balance) of 2,2'-bis-benzenesulfonyl-4,4'-dibromobiphenyl.

Example 4

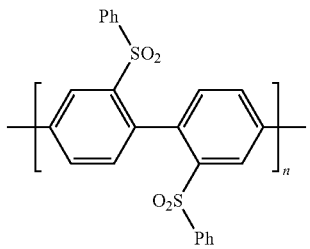

Inside the glove box, a 125 mL round-bottom flask equipped with a large stirring bar and a septum was charged with bis(1,5-cyclooctadiene)nickel(0) (2.09 g, 7.6 mmoles), cyclooctadiene (0.82 g, 7.6 mmoles), 2,2'-bipyridine (1.19 g, 7.6 mmoles), and DMAc (15 mL). The flask was heated to 70° C. under nitrogen for 30 minutes to give a dark violet-colored solution. Inside the glove box, a 50 mL round-bottom flask equipped with a septum was charged with 2,2'-bis-benzenesulfonyl-4,4'-dibromobiphenyl (2.05 g, 3.46 mmoles), and DMAc (15 mL). This flask was heated to 70° C. to dissolve the monomer and the solution was added by cannula to the reaction flask under nitrogen. The solution began to gel during addition and was completely gelled by the end. The temperature was increased to 100° C. and held there overnight.

The reaction mixture was poured into concentrated hydrochloric acid to precipitate the polymer and the mixture was chopped in a blender to disperse the polymer into particles. The polymer was collected by vacuum filtration using water to wash the polymer. The polymer was washed with concentrated hydrochloric acid followed by water. The damp polymer was washed with cyclohexane followed by methanol and dried in a vacuum oven at 70° C. under nitrogen purge to give 1.32 g (88% yield) of poly[(2,2'-bis-benzenesulfonyl-4,4'-biphenylene)]. The polymer showed low solubility in DMSO and DMAc. A broad $^1$H NMR spectrum was obtained in DMSO-$d_6$ at 100° C.: 7.25, 7.59, 7.70, 7.73, 8.08, 8.38. The molecular weight distribution was measured by gel permeation chromatography in DMAc: $M_n$ 15,300, $M_w$ 202,000, $M_z$ 1,200,000; [η] 4.49. Thermo-gravimetric analysis (10° C./min scan rate) showed an onset of decomposition at 435° C. under nitrogen. Differential scanning calorimetry showed a glass transition temperature of 225° C.

Example 5

Inside the glove box, a 300 mL round-bottom flask equipped with a large stirring bar and a septum was charged with bis(1,5-cyclooctadiene)nickel(0) (11.11 g, 40.4 mmoles), cyclooctadiene (4.37 g, 40.4 mmoles), 2,2'-bipyridine (6.31 g, 40.4 mmoles), and DMAc (120 mL). The flask was heated to 70° C. under nitrogen for 30 minutes to give a dark violet-colored solution. Inside the glove box, a 100 mL round-bottom flask equipped with a septum was charged with 2,2'-bis-benzenesulfonyl-4,4'-dibromobiphenyl (11.85 g, 20 mmoles), and DMAc (80 mL). This solution was quickly added by cannula to the reaction flask under nitrogen. The solution began to quickly increase in viscosity after the addition so the temperature was increased to 100° C. and held there for 1 hour.

The warm reaction mixture was poured into concentrated hydrochloric acid (250 mL) to precipitate the polymer and the mixture was chopped in a blender to disperse the polymer into particles. The polymer was collected by vacuum filtration using water to wash the polymer. The polymer was washed with concentrated hydrochloric acid followed by water. The damp polymer was washed with hexane followed by methanol and dried in a vacuum oven at 70° C. under nitrogen purge to give 8.35 g (97% yield) of poly[(2,2'-bis-benzenesulfonyl-4,4'-biphenylene)]. The polymer showed low solubility in DMSO and DMAc. A broad $^1$H NMR spectrum was obtained in DMSO-$d_6$ at 120° C.: 7.29, 7.63, 7.73, 7.74, 8.10, 8.41. The molecular weight distribution was measured by gel permeation chromatography in DMAc: $M_n$ 19,400, $M_w$ 83,800, $M_z$ 244,000; [η] 4.32. Thermo-gravimetric analysis (10° C./min scan rate) showed an onset of decomposition at 400° C. under air. Differential scanning calorimetry showed a glass transition temperature of 225° C.

Comparative Example 1

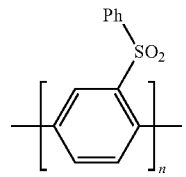

Inside the glove box, a 300 mL round-bottom flask equipped with a large stirring bar and a septum was charged with bis(1,5-cyclooctadiene)nickel(0) (11.11 g, 40.4 mmoles), cyclooctadiene (4.37 g, 40.4 mmoles), 2,2'-bipyridine (6.31 g, 40.4 mmoles), and DMAc (120 mL). The flask was heated to 70° C. under nitrogen for 30 minutes to give a dark violet-colored solution. Inside the glove box, a 100 mL round-bottom flask equipped with a septum was charged with 2-benzenesulfonyl-1,4-dibromobenzene (7.52 g, 20 mmoles) and DMAc (80 mL). This solution was quickly added by cannula to the reaction flask under nitrogen. The solution was stirred at 70° C. for 4 hours, but did not develop any viscosity.

The cooled reaction mixture was poured into concentrated hydrochloric acid to precipitate the polymer and the mixture was chopped in a blender to disperse the polymer into particles. The polymer was collected by vacuum filtration using water to wash the polymer. The polymer was washed with concentrated hydrochloric acid followed by water then twice with methanol. The damp polymer was dried in a vacuum oven at 70° C. under nitrogen purge to give 2.63 g (93% yield). The material showed solubility in DMSO and DMAc. A complex $^1$H NMR spectrum was obtained in DMSO-$d_6$ with major peaks at 6.7-8.9. The molecular weight distribution was measured by gel permeation chromatography in DMAc: $M_n$ 750, $M_w$ 3000, $M_z$ 7,800; [η] 0.09. The material was too low in molecular weight to be considered the desired polymer, poly(benzenesulfonyl-1,4-phenylene).

Example 6

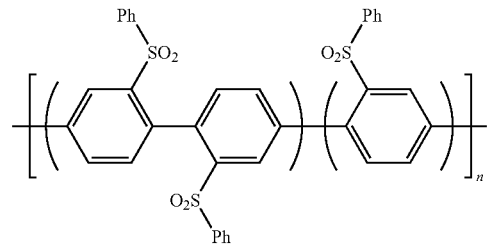

Inside the glove box, a 125 mL round-bottom flask equipped with a large stirring bar and a septum was charged with bis(1,5-cyclooctadiene)nickel(0) (2.78 g, 10.1 mmoles), cyclooctadiene (1.09 g, 10.1 mmoles), 2,2'-bipyridine (1.58 g, 10.1 mmoles), and DMAc (25 mL). The flask was heated to 70° C. under nitrogen for 30 minutes to give a dark violet-colored solution. Inside the glove box, a 50 mL round-bottom flask equipped with a septum was charged with 2,2'-bis-benzenesulfonyl-4,4'-dibromobiphenyl (2.81 g, 4.75 mmoles), 2-benzenesulfonyl-1,4-dibromobenzene (0.094 g, 0.25 mmoles) and DMAc (25 mL). This solution was quickly added by cannula to the reaction flask under nitrogen. The solution began to thicken, but did not gel, so it was stirred at 70° C. for 6 hours.

The cooled reaction mixture was poured into concentrated hydrochloric acid to precipitate the polymer and the mixture was chopped in a blender to disperse the polymer into particles. The polymer was collected by vacuum filtration using methanol to wash the polymer. The polymer was washed several times with concentrated hydrochloric acid followed by methanol. The damp polymer was dried in a vacuum oven at 80° C. under nitrogen purge to give 2.17 g (100% yield) of the 95:5 copolymer, poly[(2,2'-bis-benzenesulfonyl-4,4'-biphenylene)-co-(benzenesulfonyl-1,4-phenylene)]. The polymer showed low solubility in DMSO and DMAc. A broad $^1$H NMR spectrum was obtained in DMSO-$d_6$ at 100° C.: 7.25, 7.60, 7.70, 7.71, 8.07, 8.37. Thermo-gravimetric analysis (10° C./min scan rate) showed an onset of decomposition at 400° C. under air. Differential scanning calorimetry showed a glass transition temperature of 224° C. This shows that 5 mole percent comonomer had a negligible effect on the glass transition temperature when compared to the homopolymers of Examples 4 and 5.

Example 7

Inside the glove box, a 125 mL round-bottom flask equipped with a large stirring bar and a septum was charged with bis(1,5-cyclooctadiene)nickel(0) (2.78 g, 10.1 mmoles), cyclooctadiene (1.09 g, 10.1 mmoles), 2,2'-bipyridine (1.58 g, 10.1 mmoles), and DMAc (25 mL). The flask was heated to 70° C. under nitrogen for 30 minutes to give a dark violet-colored solution. Inside the glove box, a 50 mL round-bottom flask equipped with a septum was charged with 2,2'-bis-benzenesulfonyl-4,4'-dibromobiphenyl (2.67 g, 4.5 mmoles), 2-benzenesulfonyl-1,4-dibromobenzene (0.188 g, 0.50 mmoles) and DMAc (25 mL). This solution was quickly added by cannula to the reaction flask under nitrogen. The solution began to thicken, but did not gel, so it was stirred at 70° C. for 6 hours.

The cooled reaction mixture was poured into concentrated hydrochloric acid to precipitate the polymer and the mixture was chopped in a blender to disperse the polymer into particles. The polymer was collected by vacuum filtration using methanol to wash the polymer. The polymer was washed twice with concentrated hydrochloric acid followed by methanol. The damp polymer was dried in a vacuum oven at 80° C. under nitrogen purge to give 2.05 g (100% yield) of the 90:10 copolymer, poly[(2,2'-bis-benzenesulfonyl-4,4'-biphenylene)-co-(benzenesulfonyl-1,4-phenylene)]. A broad $^1$H NMR spectrum was obtained in DMSO-$d_6$ at 100° C. with major peaks at 7.27, 7.62, 7.71, 7.73, 8.09, and 8.39, and minor peaks at 6.96, 7.50, 7.95, 8.47, and 8.65. The molecular weight distribution was measured by gel permeation chromatography in DMAc: $M_n$ 9,820, $M_w$ 41,200, $M_z$ 92,500; [η] 2.02. Thermo-gravimetric analysis (10° C./min scan rate) showed an onset of decomposition at 400° C. under air. Differential scanning calorimetry showed a glass transition temperature of 223° C. This shows that 10 mole percent comonomer had a negligible effect on the glass transition temperature when compared to the homopolymers of Examples 4 and 5.

The copolymer (0.5 g) was dissolved in DMAc at 160° C. to give 5.0 weight % solution. The cooled solution was filtered using a glass microfiber syringe filter and poured into a glass film-casting dish, which was placed on a leveled drying stage in a nitrogen-purged drying chamber. The dried film became slightly hazy and lifted free of the dish on its own. The film was further dried at 150° C. in a vacuum oven under nitrogen purge. The film was strong in tension, but was brittle as it broke into pieces when folded over and creased.

The copolymer (0.5 g) was dissolved in 1,1,2,2-tetrachloroethane at room temperature to give 3.2 weight % solution. The solution was filtered using a glass microfiber syringe filter and poured into a glass film-casting dish, which was placed on a leveled drying stage in a nitrogen-purged drying chamber. The film was further dried at 80° C. in a vacuum oven under nitrogen purge. The film had become opaque and was floated free of the dish in water after scoring the edge. The film was not strong in tension and was brittle such that film could not even be folded over.

2-Benzenesulfonyl-1,4-dichlorobenzene

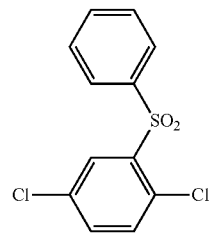 [SMILES: O=S(=O)(c1ccccc1)c1cc(Cl)ccc1Cl]

A modification of the published procedures of Hagberg, Olson, and Sheares in Macromolecules, 2004, 37, 4748 was used. A 200 mL round-bottom flask equipped with a reflux condenser, stirring bar, and gas inlet was charged with 2,5-dichlorobenzenesulfonyl chloride (12.28 g, 50 mmoles), benzene (13.4 mL, 150 mmoles), and anhydrous nitromethane (50 mL). Aluminum chloride (7.33 g, 55 mmoles) was added and the mixture stirred until dissolved under nitrogen. The solution was heated to 100° C. overnight. The solution was cooled to room temperature and poured into 100 g water mixed with 25 mL hydrochloric acid. The mixture was extracted several times with dichloromethane. The organic extracts were dried with sodium sulfate, filtered, and evaporated, then the solids were dried in a vacuum oven to give 14.38 g (100% crude yield). The solids were recrystallized from ethanol after treating with decolorizing carbon to give about 14 g in two crops. The solids were recrystallized from ethanol to give 12.24 g (85% yield) of 2-benzenesulfonyl-1, 4-dichlorobenzene. $^1$H NMR (DMSO-$d_6$): 7.65 (ddd, 8.4, 7.5, 1.7 Hz, 2H), 7.67 (d, 8.6 Hz, 1H), 7.76 (tt, 7.5, 1.2 Hz, 1H), 7.83 (dd, 8.6, 2.6 Hz, 1H), 7.98 (ddd, 8.4, 1.7, 1.2 Hz, 2H), 8.27 (d, 2.6 Hz, 1H).

4,4'-Dichlorobiphenyl-2,2'-disulfonic acid, sodium salt

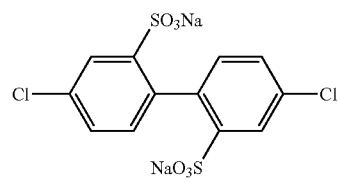

A modification of the published procedures of Courtot and Lin in Bull. Soc. Chim. Fr. 1931, 49, 1047 was used. A 500 mL round-bottom flask equipped with an addition funnel and stirring bar was charged with benzidine-2,2'-disulfonic acid, 70% technical grade (34.4 g, 0.1 moles), ice (50 g), and hydrochloric acid (65 mL). The mixture was chilled to 0° C. in an ice bath. A solution of sodium nitrite (15 g, 0.22 moles) dissolved in water (50 mL) was added dropwise during which the diazonium salt precipitated from the resulting solution. The addition was stopped when gas evolution was observed and the slurry was kept cold. A 1 L round-bottom flask equipped with a stirring bar was charged with copper(I) chloride (25 g, 0.25 moles) and hydrochloric acid (85 mL) to give a dark green solution then chilled to 0° C. in an ice bath. The cold diazonium salt slurry was added slowly to the solution to give immediate gas evolution. The solution was stirred until it warmed to room temperature and evaporated to remove excess hydrochloric acid. The solids were dissolved in water, treated with sodium carbonate to give pH 7, which precipitate residual copper salts, filtered and evaporated to give a tan solid. The solids were recrystallized twice from ethanol after treating with decolorizing carbon and dried under vacuum at 80° C. to give 9.0 g (21 yield) of 4,4'-dichlorobiphenyl-2,2'-disulfonic acid, sodium salt. $^1$H NMR (DMSO-d$_6$): 7.19 (d, 8.3 Hz, 2H), 7.42 (dd, 8.3 and 2.1 Hz, 2H), 7.96 (d, 2.1 Hz, 2H).

Example 8

4,4'-Dichlorobiphenyl-2,2'-disulfonic acid, sodium salt

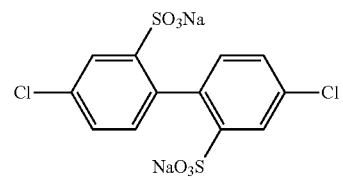

Inside a glove box, a 300 mL round-bottom flask equipped with a reflux condenser, stirring bar, and gas inlet was charged with anhydrous 2,5-dichlorobenzenesulfonic acid, sodium salt (24.9 g, 0.1 moles), activated copper bronze (12.7 g, 0.2 moles), and DMAc (100 mL). The mixture was heated to 150° C. overnight under nitrogen. The mixture was poured into water (1 L) and the solid removed by vacuum filtration. The filtrate was treated with sufficient sodium carbonate to precipitate residual copper salts, which were removed by vacuum filtration. The solution was evaporated and the residue dried at 150° C. under vacuum. The solids (29.75 g) were dissolved in a mixture of ethanol and water, acidified with acetic acid, filtered, and concentrated to give an oil. The oil was dissolved in ethanol (100 mL) and allowed to set overnight to give a copious white solid, which was collected by vacuum filtration and washed twice with ethanol. The solids were recrystallized twice from ethanol to give 10.05 g (47% yield) of 4,4'-dichlorobiphenyl-2,2'-disulfonic acid, sodium salt. $^1$H NMR (DMSO-d$_6$): 7.30 (d, 8.2 Hz, 2H), 7.34 (dd, 8.2, 2.3 Hz, 2H), 7.82 (d, 2.2 Hz, 2H).

4,4'-Dichlorobiphenyl-2,2'-disulfonyl dichloride

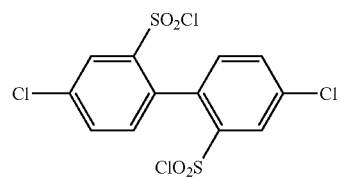 [SMILES: O=S(=O)(Cl)c1cc(Cl)ccc1-c1ccc(Cl)cc1S(=O)(=O)Cl]

A modification of the published procedures of Courtot and Lin in Bull. Soc. Chim. Fr. 1931, 49, 1047 was used. Inside a glove box, a 100 mL round-bottom flask equipped with a reflux condenser, stirring bar, and gas inlet was charged with 4,4'-dichlorobiphenyl-2,2'-disulfonic acid, sodium salt (18.8 g, 44 mmoles), phosphorus pentachloride (21 g, 100 mmoles), and phosphorus oxychloride (42 mL). The mixture was heated to a mild reflux (130° C.) for 6 hours under nitrogen. The mixture was poured into water (500 kg) and stirred about 45 minutes until the solids were finely divided. The solids were collected by vacuum filtration, washed well with water, and air dried on the filter then dried under vacuum at 60° C. to give 17.13 g (93% crude yield). The solids were recrystallized from toluene, collected by vacuum filtration, and dried under vacuum at 80° C. A second crop was obtained by concentrating the filtrate and diluting with hexane. The combined yield was 15.41 g (83%) of 4,4'-dichlorobiphenyl-2,2'-disulfonyl dichloride. $^1$H NMR (CDCl$_3$): 7.46 (d, 8.2 Hz, 2H), 7.77 (dd, 8.2, 2.2 Hz, 2H), 8.24 (d, 2.2 Hz, 2H).

Example 9

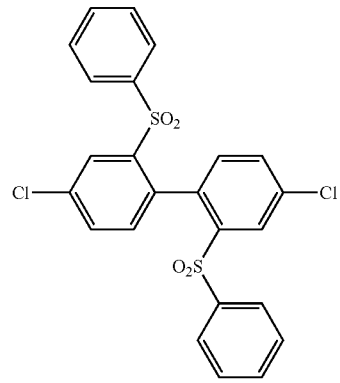 [SMILES: O=S(=O)(c1ccccc1)c1cc(Cl)ccc1-c1ccc(Cl)cc1S(=O)(=O)c1ccccc1]

Inside a glove box, a 125 mL round-bottom flask equipped with a stirring bar, reflux condenser, and gas inlet was charged with 4,4'-dichlorobiphenyl-2,2'-disulfonyl dichloride (15.4 g, 36.7 mmoles), benzene (25 mL, 280 mmoles), and anhydrous nitromethane (75 mL). Aluminum chloride (11 g, 81 mmoles) was added and the mixture stirred until dissolved under nitrogen. The solution was heated to 100° C. for 8 hours. The solution was cooled to room temperature and poured onto 200 g ice mixed with 100 mL hydrochloric acid. The mixture was extracted several times with dichloromethane. The organic extracts were washed with water, dried with sodium carbonate, filtered to give a dark solution. The solution was treated with decolorizing carbon and heated to a reflux, then filtered through filter aid, evaporated, and the solids dried at 150° C. in a vacuum oven for 8 hr to give 18.02 g (97% crude yield).

The mixture was purified by column chromatography using silica gel and dichloromethane ($R_f$ 0.28) to give 14.3 g (77% yield) of 2,2'-bis-benzenesulfonyl-4,4'-dichlorobiphenyl. The solids were recrystallized from xylenes to give 13.08 g (71%). $^1$H NMR (DMSO-$d_6$): 6.96 (d, 8.2 Hz, 2H), 7.55 (bs, 4H), 7.56 (m, 8.1 Hz, 4H), 7.69 (m, 2H), 7.74 (dd, 8.2, 2.2 Hz, 2H), 8.13 (d, 2.2 Hz, 2H). $^{13}$C NMR (CDCl$_3$): 128.42 (4CH), 129.14 (4CH), 129.58 (2CH), 132.21 (2CH), 133.84 (2CH), 134.13 (2CH), 134.68 (2C), 135.61 (2C), 140.42 (2C), 141.42 (2C). MS (M+H$^+$): m/e 502.99 (100%), 504.99 (75%), exact mass for $C_{24}H_{17}O_4Cl_2S_2$, 502.99 (100%), 504.99 (72.9%).

Example 10

Inside the glove box, a 50 mL round-bottom flask equipped with a large stirring bar and a septum was charged with bis(1,5-cyclooctadiene)nickel(0) (0.578 g, 2.1 mmoles), cyclooctadiene (0.227 g, 2.1 mmoles), 2,2'-bipyridine (0.328 g, 2.1 mmoles), and DMAc (5 mL). The flask was heated to 70° C. under nitrogen for 30 minutes to give a dark violet-colored solution. Inside the glove box, a 25 mL round-bottom flask equipped with a septum was charged with 2,2'-bis-benzenesulfonyl-4,4'-dichlorobiphenyl (0.453 g, 0.9 mmoles), 2-benzenesulfonyl-1,4-dichlorobenzene (0.029 g, 0.1 mmoles), and DMAc (5 mL). This flask was heated to 70° C. to dissolve the monomers and the solution was added by cannula to the reaction flask under nitrogen. The viscosity of the solution increased slowly over the course of an hour as the color faded to black.

After reacting overnight at 70° C., the reaction mixture was diluted with DMAc (20 mL), poured into concentrated hydrochloric acid to precipitate the polymer, and rinsed from the flask with methanol and concentrated hydrochloric acid. The mixture was chopped in a blender to disperse the polymer into particles. The polymer was collected by vacuum filtration and rinsed from the blender jar with methanol, then washed on the filter three times with a mixture of methanol and concentrated hydrochloric acid. The polymer was then washed alternatively with water and methanol several times, and dried in a vacuum oven at 80° C. under nitrogen purge to give 0.41 g (100% yield) of the 90:10 copolymer, poly[(2,2'-bis-benzenesulfonyl-4,4'-biphenylene)-co-(benzenesulfonyl-1,4-phenylene)]. The molecular weight distribution was measured by gel permeation chromatography in DMAc: $M_n$ 60,100, $M_w$ 331,000, $M_z$ 1,600,000; [η] 9.12. Thermo-gravimetric analysis (10° C./min scan rate) showed an onset of decomposition at 400° C. under air. Differential scanning calorimetry showed a glass transition temperature of 227° C. This shows that 10 mole percent comonomer had no effect on the glass transition temperature when compared to the homopolymers of Examples 4 and 5, and was in fact higher presumably due to the improved reactivity of the chlorine groups, which also led to higher molecular weights than the copolymers of Examples 6 and 7.

The copolymer (0.1 g) was dissolved in 1,1,2,2-tetrachloroethane to give 1.1 weight % solution. The solution was poured into a polymethylpentene Petri dish and placed on a leveled drying stage in a nitrogen-purged drying chamber. The dried film lifted free of the dish on its own. The film was further dried at 60° C. in a vacuum oven under nitrogen purge. The film was strong, flexible, tough, and creasable.

Dynamic Mechanical Analysis of the film showed a high storage modulus of 4112 MPa at 25° C. and good retention at elevated temperatures with a value of 1396 MPa at 200° C. and about 1000 MPa at 220° C. The tan delta plot confirmed the high Tg with a peak at 240° C. Compared to poly(2,5-benzophenone) with reported Tg of 149 to 217° C. (Wang and Quirk, Macromolecules 1995, 28 (10), p. 3495), the copolymer film showed a higher Tg and much better retention of storage modulus at temperatures between 140 and 220° C.

What is claimed is:

1. A polymer consisting of repeating units of Formula (I):

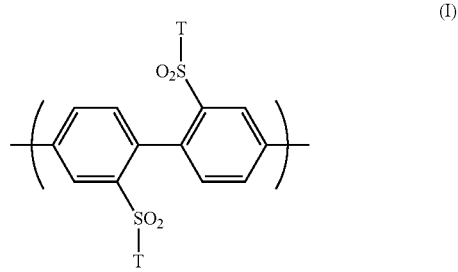

and optionally, repeating units of Formula (II),

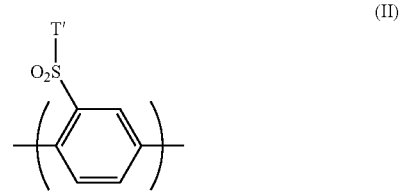

where T and T' are each an aromatic carbocyclic group, and wherein the aromatic carbocyclic group is substituted with a non-reactive functional group.

2. The polymer of claim 1 that has a number average molecular weight of at least about 5,000.

3. The polymer of claim 1 wherein T is phenyl.

4. The polymer of claim 1 that has a number average molecular weight of at least about 5,000.

5. The polymer of claim 1 or 3 wherein T' is phenyl.

6. The polymer of claim 1 wherein the aromatic carbocyclic group comprises multiple condensed rings in which at least one is aromatic.

7. The polymer of claim 1 wherein the aromatic carbocyclic group is phenyl, biphenyl, 1,2,3,4 tetrahydronaphthyl, naphthyl, anthryl, or phenanthryl.

* * * * *